(12) United States Patent
Wang

(10) Patent No.: US 11,728,486 B1
(45) Date of Patent: Aug. 15, 2023

(54) ELECTRODE MATERIALS PREPARED BY NANOPOROUS CARBON COMPOSITE TECHNOLOGY

(71) Applicant: Jing Wang, Amherst, MA (US)

(72) Inventor: Jing Wang, Amherst, MA (US)

( * ) Notice: Subject to any disclaimer, the term of this patent is extended or adjusted under 35 U.S.C. 154(b) by 0 days.

(21) Appl. No.: 17/875,290

(22) Filed: Jul. 27, 2022

(51) Int. Cl.
*H01M 4/62* (2006.01)
*H01M 4/36* (2006.01)
*H01M 10/05* (2010.01)
*H01M 10/0525* (2010.01)
*H01M 4/02* (2006.01)

(52) U.S. Cl.
CPC .......... *H01M 4/621* (2013.01); *H01M 4/364* (2013.01); *H01M 10/0525* (2013.01); *H01M 2004/021* (2013.01)

(58) Field of Classification Search
None
See application file for complete search history.

(56) References Cited

U.S. PATENT DOCUMENTS

| | | |
|---|---|---|
| 7,071,287 B2 | 7/2006 | Rhine et al. |
| 7,074,880 B2 | 7/2006 | Rhine et al. |
| 7,704,422 B2 | 4/2010 | Wang |
| 7,919,024 B2 | 4/2011 | Wang |
| 8,414,805 B2 | 4/2013 | Wang |
| 9,431,675 B2 | 8/2016 | Guerfi et al. |
| 10,128,496 B2 | 11/2018 | Laicer et al. |
| 10,263,279 B2 | 4/2019 | Yushin et al. |
| 10,439,207 B2 | 10/2019 | Yushin et al. |
| 10,601,045 B1* | 3/2020 | Wang ....................... H01M 4/60 |
| 10,629,898 B2 | 4/2020 | Yushin et al. |
| 10,797,311 B2 | 10/2020 | Huang et al. |
| 10,916,767 B2 | 2/2021 | Chu et al. |
| 10,916,803 B1 | 2/2021 | Henslee et al. |
| 2019/0020028 A1* | 1/2019 | Wang ..................... D01D 5/003 |
| 2019/0260032 A1* | 8/2019 | Belcher ............... H01M 50/417 |
| 2020/0269207 A1* | 8/2020 | Zafiropoulos ........... C01B 32/00 |
| 2020/0303723 A1 | 9/2020 | Zafiropoulos et al. |
| 2020/0303793 A1 | 9/2020 | Zafiropoulos et al. |
| 2021/0371592 A1 | 12/2021 | Zafiropoulos et al. |
| 2022/0069290 A1* | 3/2022 | Zafiropoulos ......... H01M 4/364 |
| 2022/0185970 A1 | 6/2022 | Leventis et al. |

FOREIGN PATENT DOCUMENTS

| | | |
|---|---|---|
| CN | 105576241 A | 5/2016 |
| CN | 106025228 A | 10/2016 |
| CN | 109148838 A | 1/2019 |

(Continued)

*Primary Examiner* — Maria Laios
*Assistant Examiner* — Angela J Martin

(57) ABSTRACT

The present invention provides a nanoporous carbon composite (NCC) for use as an electrode material. NCC comprises active electrode material, one or more additives in a form of particles or fibers, and a nanoporous carbon phase that binds pieces of the active electrode material and pieces of the additive with each other. The nanoporous carbon phase is derived from a polyimide precipitate prepared from imidization of a poly(amic acid) solution. NCC further comprises micro-cracks distributed throughout the NCC to build a three-dimensional (3D) network, wherein the micro-crack is bounded in one or more parts by a surface of the active electrode material or the additive.

20 Claims, 6 Drawing Sheets

(56) References Cited

FOREIGN PATENT DOCUMENTS

| CN | 110911682 | * | 3/2020 | ............. | H01M 4/62 |
|----|-----------|---|--------|---|---|
| CN | 113387707 A | | 9/2021 | | |
| EP | 3289624 A1 | | 3/2018 | | |
| EP | 3382776 A1 | | 10/2018 | | |
| WO | 2012105671 A1 | | 8/2012 | | |

* cited by examiner

ELECTRODE MATERIALS PREPARED BY NANOPOROUS CARBON COMPOSITE TECHNOLOGY

CROSS REFERENCES TO RELATED APPLICATIONS

This application claims the benefits of priority from U.S. Provisional Patent Applications No. 63/226,345 filed Jul. 28, 2021 and No. 63/301,469 filed Jan. 20, 2022, which are hereby incorporated by references in its entirety with any definitions of terms in the present application controlling.

FIELD OF THE INVENTION

The present invention relates to electrode materials for batteries, particularly lithium-ion (Li-ion) batteries, and other electrochemical devices.

BACKGROUND OF THE INVENTION

There are numerous efforts in making a thin nanoporous carbon coating on different kinds of active electrode particles for Li-ion batteries. A strong and uniform nanoporous carbon coating on active electrode particles has the following merits: preventing a direct contact of the electrode surface with the electrolyte, forming a more stable solid electrolyte interface (SEI), improving the electrical conductivity of the electrode, increasing mechanical strength of the active particles to minimize particle breakdown during repeated charging/discharging cycles, and an increased cycle life of the battery. The thickness of the carbon coating is usually in the range of 3 nm to 30 nm. However, above merits of the carbon coating may come at a price because metal ions have to diffuse through the carbon coating, which might not be easy depending on the carbon coating structure.

Conventional electrode construction for lithium-ion batteries usually comprises a polymer binder, such as polyvinylidene fluoride (PVDF), for binding active electrode particles into a sheet. Such polymer binder is hydrophobic and electronically insulating, leading to an increased electrolyte diffusion resistance and increased electrical contact resistance among the active particles.

One effective method of developing high energy density Li-ion batteries is to increase electrode thickness, thus increasing the volume ratio of active materials. However, the energy density is found to have a maximum point versus electrode thickness (critical thickness) at given discharging C rates. The limit of energy/power density of thick electrodes is affected by Li-ion diffusion in active electrode materials and Li-ion depletion in the electrolyte phase. A carbon matrix comprising a three dimensional (3D) interconnected network in the electrode, in which active electrode particles are encased, may enhance the Li-ion diffusion therefore making relatively thick electrodes feasible.

Some active electrode particles utilized for batteries, such as lithium iron phosphate for Li-ion cathode, have low electronic conductivity. Yet, some other active electrode particles used in aqueous electrolyte-based batteries, such as iron oxides or reduced iron oxides, may have undesired hydrogen gas evolution during battery charging. A nanoporous carbon coating on the active electrode particles may increase the electronic conductivity of the active particles and may function as a hydrogen adsorption buffer.

Silicon based materials as anode for lithium-ion batteries have high specific capacities. For example, silicon (Si) has a theoretical specific capacity of about 4200 mAh/g, which is an order of magnitude greater than that of conventional graphite as anode active material. Unfortunately, silicon suffers from several significant drawbacks. One of the drawbacks is up to 400% volume expansion and contraction of Si that occurs as a result of Li-ion intercalation and deintercalation during charging/discharging cycling of the battery. Such huge volume changes of Si cause several problems including unstable solid electrolyte interphase (SEI) formation, disintegration of electrode structure, and poor electrical contact among electrode materials.

Silicon-carbon (Si—C) composites are developed to circumvent the limitations of pure Si based materials. The Si—C composites are constructed either by an aggregation of Si nanoparticles coated with a conductive carbon layer or by Si nanoparticles embedded in a porous carbon matrix.

One prior art, U.S. Pat. No. 10,629,898 B2, describes a porous Si—C composite for use as anode material for Li-ion batteries. The composite comprises a plurality of agglomerated nanocomposites. The nanocomposite includes a dendritic carbon particle formed from a three dimensional, randomly ordered assembly of carbon nanoparticles. Silicon nanoparticles are disposed onto the surfaces of the dendritic particle to form a nanocomposite particle. In certain situations, at least a portion of a surface of the carbon dendritic particle is further coated with an electrically conductive carbon coating by chemical vapor deposition (CVD). Alternatively, instead of an electrically conducting coating, an electrically conducting additive can be used to ensure that dendritic particles of different nanocomposites are in high contact with one another. One example of such an additive is an organic binder that is converted to carbon during fabrication.

Another prior art, U.S. Ser. No. 10/128,496B2, describes a carbon composite comprising active anode particles embedded within a carbon matrix with a bimodal pore size distribution and a 3D network. An example of this porous anode material is a Si—C composite formed using a bi-continuous micro-emulsion (BME) template.

According to one embodiment of the U.S. Ser. No. 10/128,496B2 patent, the porous material is prepared by a method comprising steps of (a) forming a BME, the BME comprising a polymer A, a polymer B, and a di-block polymer A-B; (b) solidifying the BME to form a solid BME; (c) removing either, but not both, of the polymer A or the polymer B from the solid BME, whereby a porous template is produced; (d) impregnating the porous template with a mixture comprising active anode particles and a carbon forming precursor; (e) treating the impregnated porous template so that the carbon forming precursor is converted to a carbon matrix, whereby the active anode particles are embedded in the carbon matrix, and so that the polymer B and the di-block polymer A-B are eliminated, leaving voids to create an interconnected network of pores that is substantially continuous in all three dimensions. The carbon matrix derived from the carbon forming precursor comprises pores in a micropore or nanopore region while the voids created by the elimination of the polymer B and the polymer A-B is in a second region with bigger average pore size in the pore size distribution plot.

One of the drawbacks of this BME process is relatively high cost of the multi-step process. Another drawback is active particle size limited by the voids of BME template, where the active particles have to be much smaller compared to the voids of BME template in order to be uniformly impregnated.

The cathode active materials of lithium-sulfur (Li—S) batteries comprise elemental sulfur or metal sulfide, such as Li2S. The Li—S batteries feature low cost, nontoxicity, and high theoretical capacity of 1672 mAh/g, which is in comparison with 250 mAh/gram for LiCoO2. One of the key challenges hindering Li—S commercialization is the polysulfides shuttle effect, in which the release and transport of polysulfides from cathode causes mossy growth on the lithium anode, leading to continuous consumption of electrolyte and limited cycle life.

Various sulfur-carbon (S—C) composites have been developed for overcoming the polysulfide shuttle effect and increasing electrical conductivity of the cathode material. In the composites, a nanoporous carbon phase encapsulates the active electrode particles to confine sulfur or lithium sulfide within the cathodes. Preferably, the carbon phase has a bimodal pore size distribution, including small pores (0.75 nm-4 nm in size) that can confine sulfur or generated sulfur compounds in the cathodes, and larger pores (30 nm-50 nm in size) that enable solvated Li ions to diffuse through into contact with the active electrode materials.

A prior art, including US2020/0269207 A1, US2020/0303723 A1, and US2020/0303793 A1, describes polyimide derived carbon aerogels for making carbon composite as electrode materials for lithium-ion batteries. Polyimide derived carbon aerogels have merits of narrow pore size distribution, high electrical conductivity, relatively high mechanical strength, and fibrillar morphology. In US2020/0269207 A1, a polyimide aerogel is utilized as carbon precursor to prepare Si—C composite; in 2020/0303723 A1, polyimide derived carbon aerogel is utilized to make S—C composite as cathode for Li—S batteries; and in US2020/0303793 A1, the polyimide derived carbon aerogel is utilized as cathode active material for lithium air or zinc air batteries.

Preparation of polyimide aerogel includes preparing a polyimide wet gel and removing the solvent within the wet gel by a drying process using a supercritical fluid, such as carbon dioxide, so that surface tension does not collapse pores. A following carbonization under an inert atmosphere converts the polyimide aerogel to the carbon aerogel. In the process of making Si—C composite, silicon nanoparticles are dispersed in a solution of poly(amic acid) before imidization of poly(amic acid) to form a polyimide wet gel.

The average pore size of the polyimide derived carbon aerogel is adjustable by controlling polymer concentration in the wet gel and by other approaches during the carbon aerogel preparation process. However, the monomodal pore size distribution of the polyimide aerogel derived carbon composite may impose a limitation for its use as monolithic electrodes. Porous carbon composites for electrode pellets or monolithic electrodes often require a bimodal pore size distribution.

Another limitation of the polyimide aerogel derived nanoporous carbon composite for use as electrode materials is its relatively high carbon content in the composite. For some applications of nanoporous carbon composites, the morphology comprises a thin nanoporous carbon coating coated on active electrode particles, where the carbon content in the composite is preferably not more than 15% or 10%. However, the morphology of the polyimide aerogel derived nanoporous carbon composite comprises active electrode particles embedded in a continuous carbon aerogel phase. As a result, it may be difficult to reduce the carbon content below 30%.

Yet, another limitation of polyimide aerogel derived nanoporous carbon composite for use as electrode materials is its relatively high manufacturing cost. One of the time consuming and high cost in the preparation of polyimide aerogel is the solvent removal from the polyimide wet gel using a supercritical carbon dioxide drying process. Because the organic solvent used for synthesis of the polyimide gel may not be compatible with the carbon dioxide under a supercritical condition, another solvent may be used to exchange original reaction solvent in the polyimide gel before the supercritical carbon dioxide drying. This additional solvent exchange step further increases the production cost of the polyimide aerogel.

Therefore, what is needed is a nanoporous carbon composite that comprises a bimodal pore size distribution in the carbon phase, providing a thin nanoporous carbon coating on active electrode particles so that the particles are bound with one another and the carbon content is not more than 15% by wt. in the composite, providing a binderless monolithic carbon electrode with high electrical conductivity and low electrolyte diffusion resistance, and providing a low cost process that is easy to scale up.

BRIEF SUMMARY OF THE INVENTION

An object of the present invention is to provide a nanoporous carbon composite (NCC) incorporating active electrode material and additive in the form of particles or fibers to bind with each other by a nanoporous carbon phase. According to an exemplary embodiment of the present invention, a nanoporous carbon composite for use as an electrode material includes a nanoporous carbon phase derived from a polyimide (PI) precipitate. The PI precipitate is prepared from imidization of a poly(amic acid) solution, using a reaction solvent. The nanoporous carbon composite also includes active electrode material and one or more additives in the form of particles, fibers, or a combination thereof, where pieces of the active electrode material and pieces of the additive are bound with each other by the nanoporous carbon phase. Further the nanoporous carbon composite includes micro-cracks distributed throughout the nanoporous carbon composite, in which the micro-crack is bounded in one or more parts by a surface of the active electrode material or the additive.

Another object of the present invention is to provide an electrochemical cell, such as a battery cell, having at least two electrodes, wherein at least one of the two electrodes comprises NCC. According to another exemplary embodiment of the present invention, an electrochemical cell includes two electrodes, a separator positioned between the two electrodes, electrolyte, and current collectors. One of the two electrodes comprises NCC.

DETAILED PATENT DESCRIPTION

Figure 1:
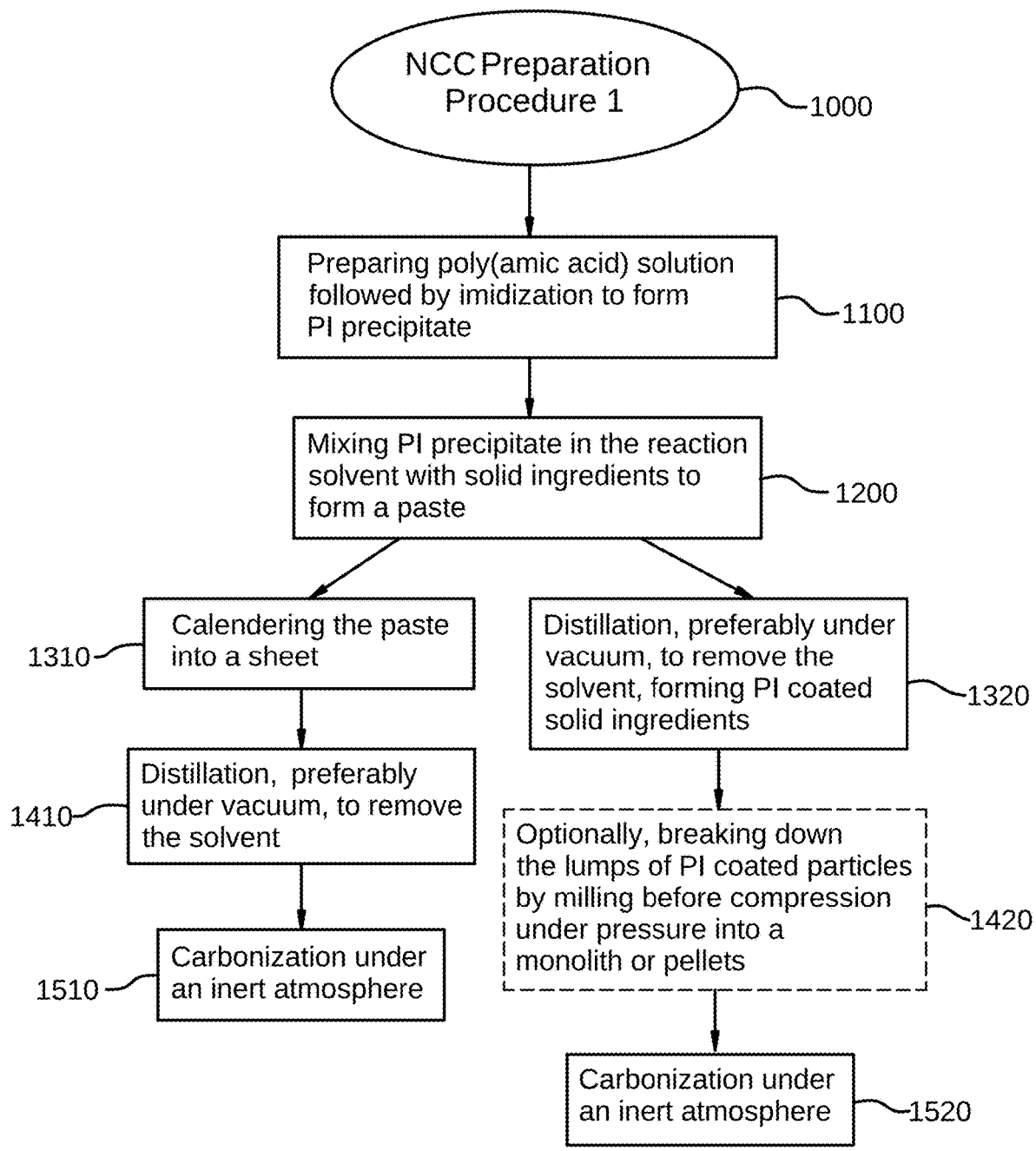
FIG. 1 shows a first flow diagram illustrating a preparation process of NCC using PI precipitate as a carbon precursor.
Figure 2:
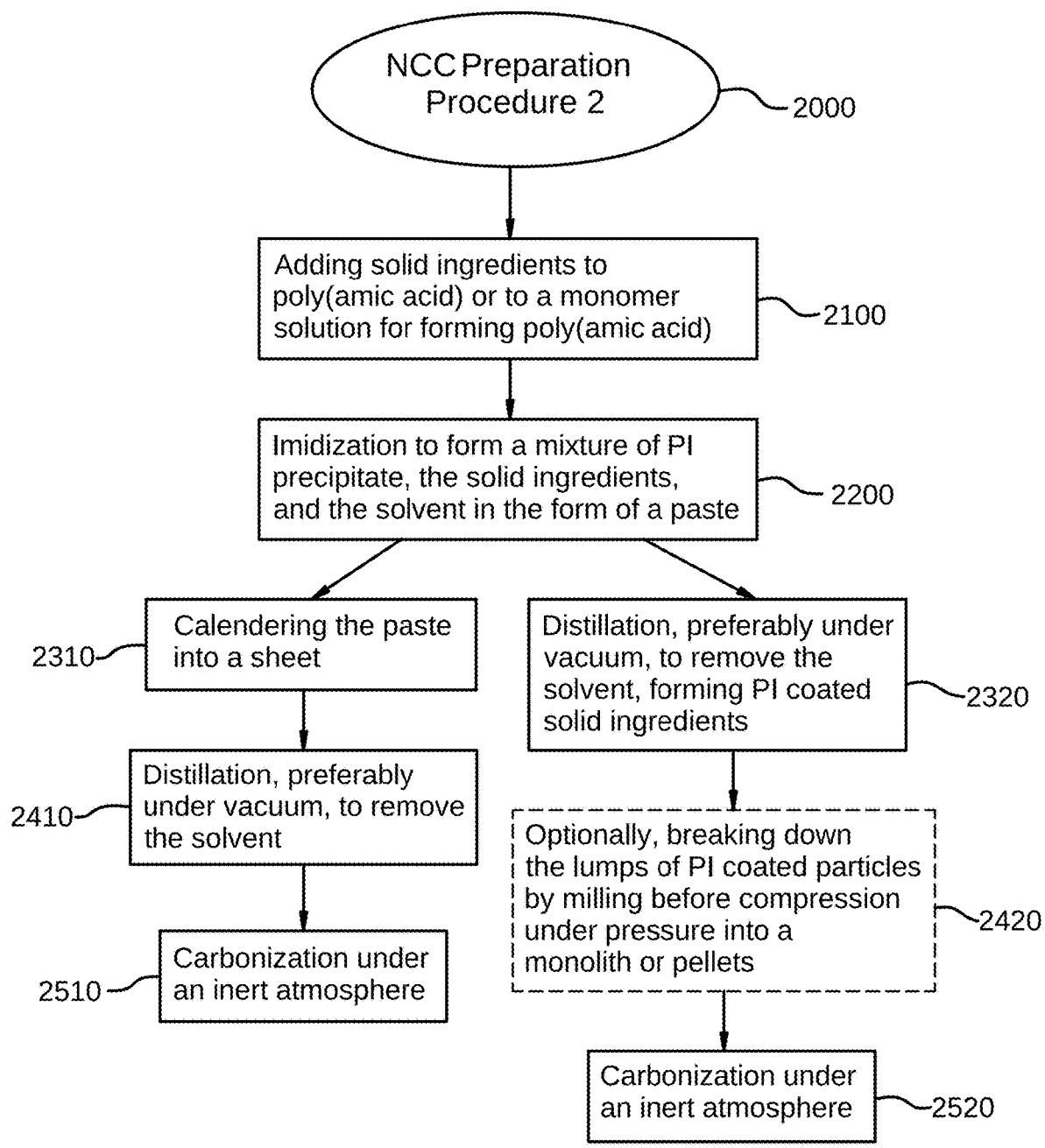
FIG. 2 shows a second flow diagram illustrating a second preparation process of NCC using poly(amic acid) as a starting material for the carbon precursor.
Figure 3:
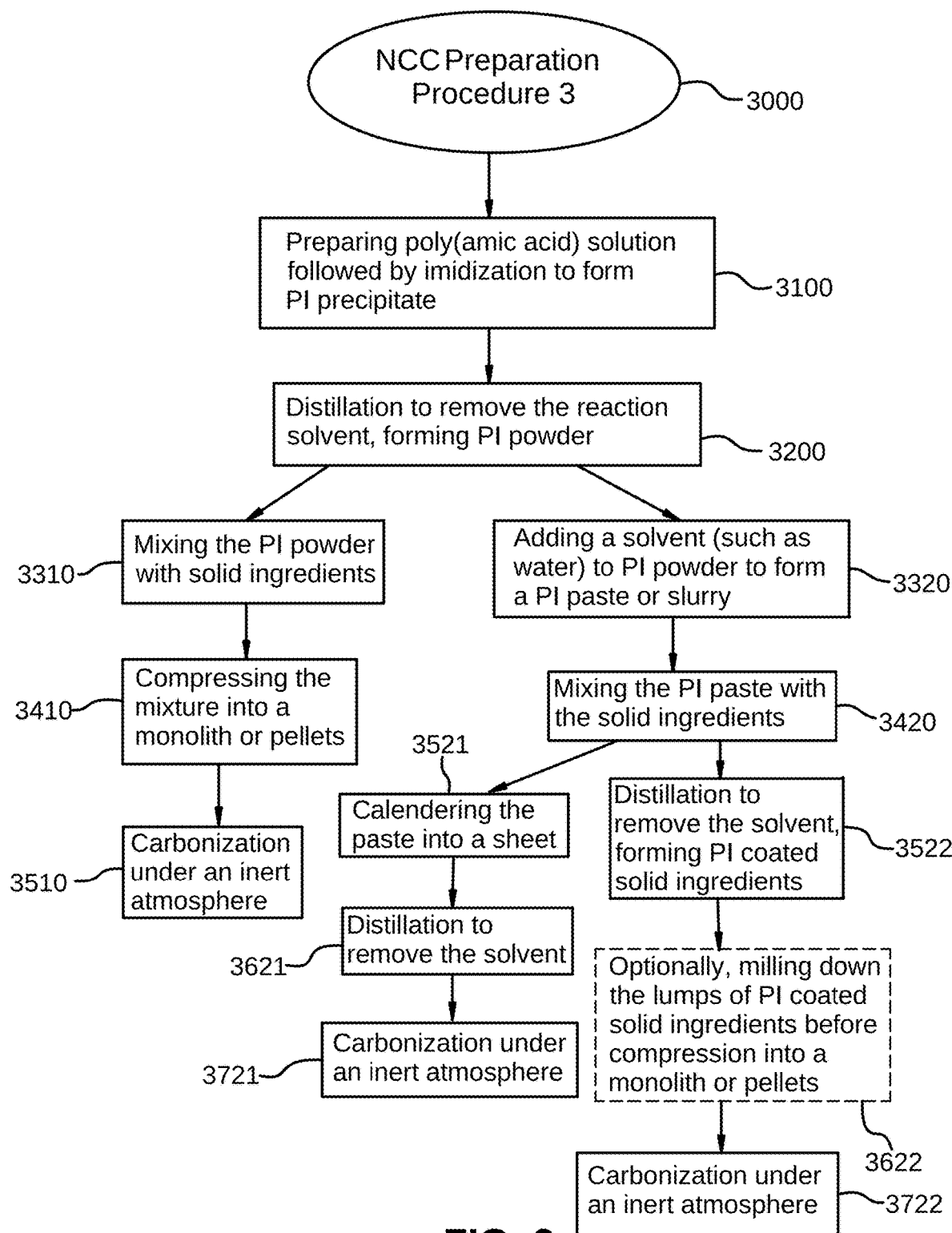
FIG. 3 shows a third flow diagram illustrating yet a third preparation process of NCC using polyimide powder as a starting material for the carbon precursor.
Figure 4:
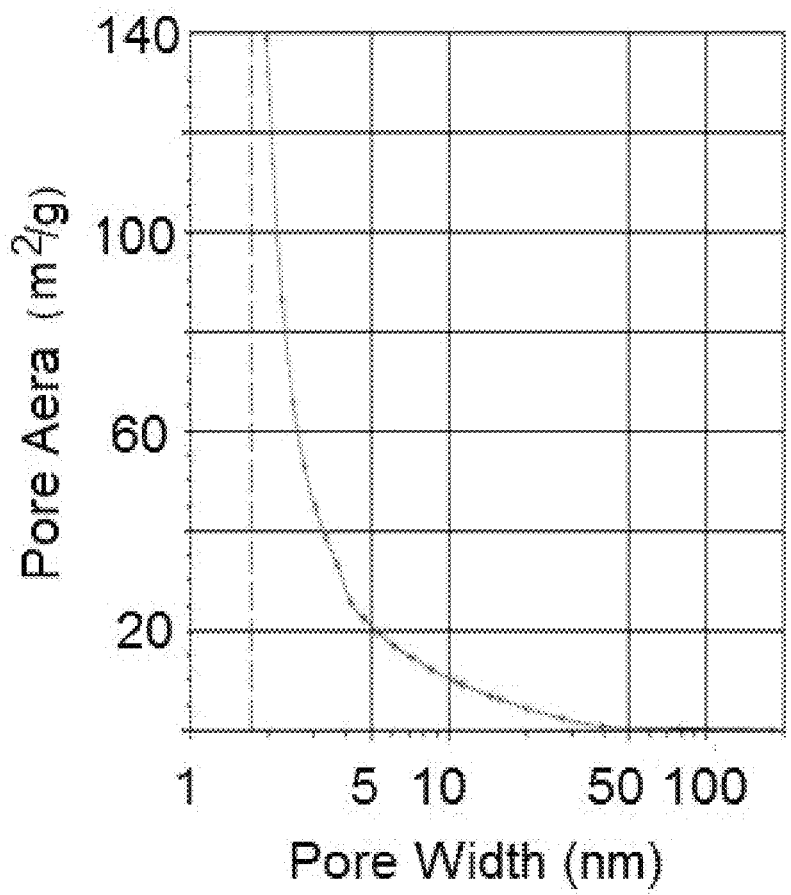
FIG. 4 displays a Brunauer-Emmett-Teller (BET) spectrum of an NCC based activated carbon-carbon composite (AC-C) sample prepared from a mixture consisting of 80% PI powder and 20% activated carbon powder.
Figure 5:
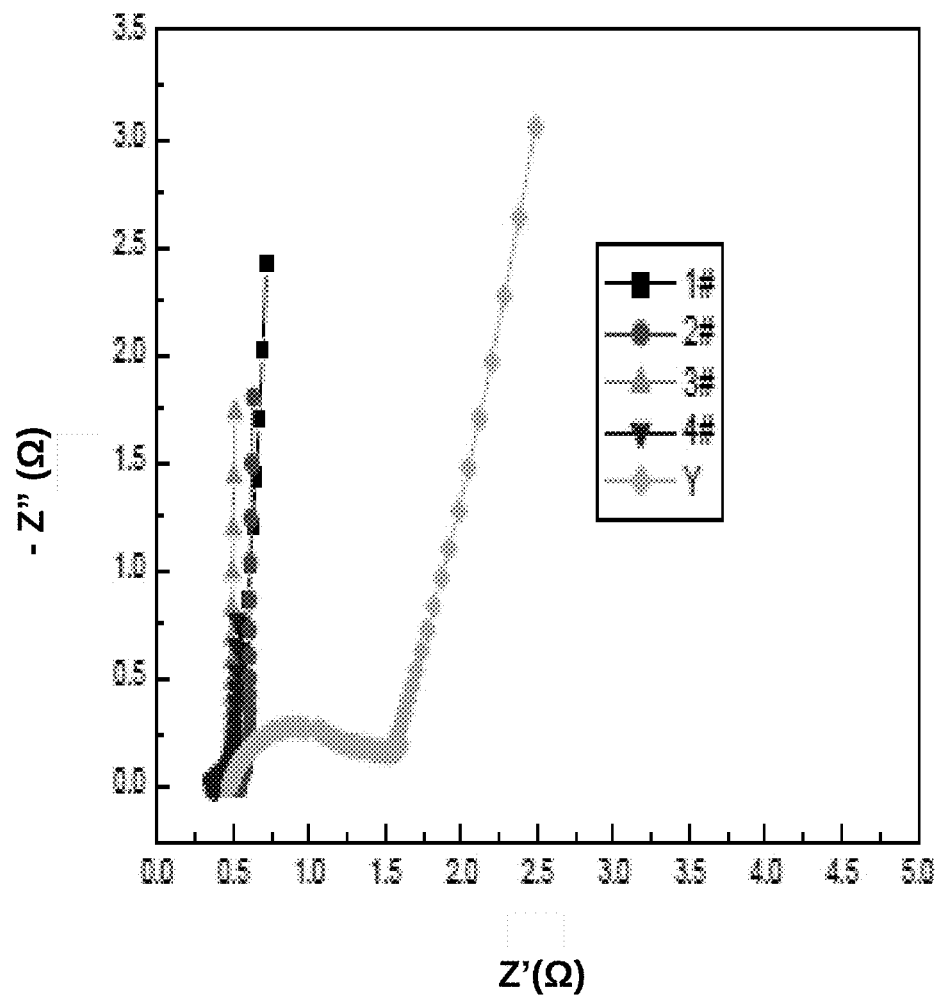
FIG. 5 illustrates impedance spectra of an NCC based AC-C sample and comparable samples of conventional activated carbon electrodes, in which the AC-C sample is prepared from polyimide precipitate and activated carbon in the forms of powder and short fiber, at a mass ratio of 82% activated carbon and 18% of the PI precipitate. In these impedance plots, Z' on the x-axis is the real part of the impedance while the Z" on the y-axis is the imaginary part of the impedance.
Figure 6:
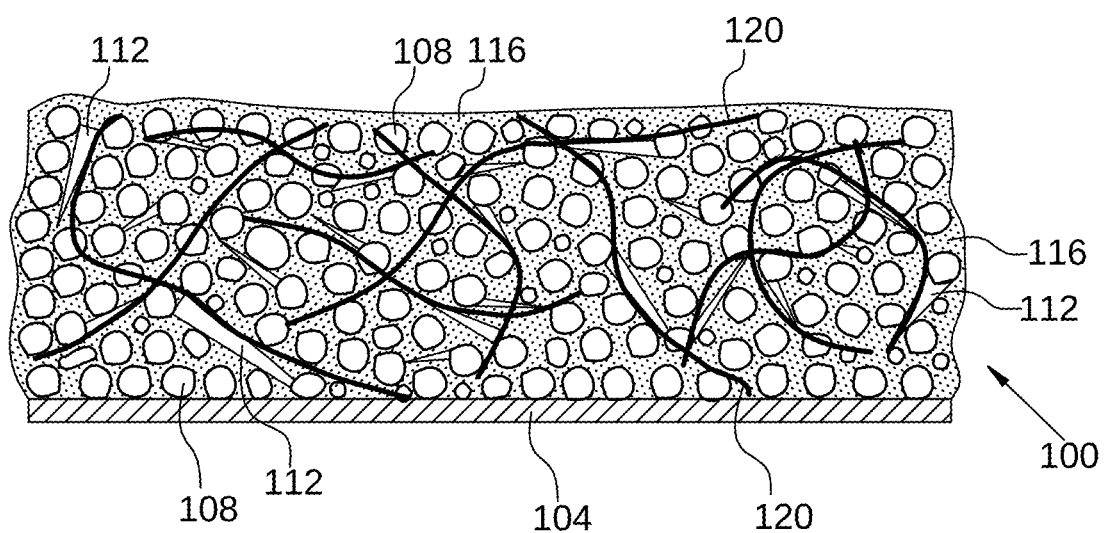
FIG. 6 illustrates a morphology of a monolithic NCC electrode disposed on a current collector.

Aspects of the present invention are disclosed in the following descriptions. FIGS. 1-3 are flow diagrams illustrating the NCC preparation processes, in which the solid ingredients refer to active electrode material and additive in the form of particles or fibers. Each of the blocks in the FIGS. 1-3 describes a process step in the corresponding procedure. The plots in FIGS. 4 and 5 are directed to specific embodiments of the invention. FIG. 6 illustrates a sample morphology of NCC electrode (100) disposed on a current collector (104). The NCC comprises active electrode particles (108), additive in the form of fibers (120), a nanoporous carbon phase (116) that binds the active electrode particles (108) and the additive in the fiber form (120) with each other, and micro-cracks (112) distributed throughout the NCC. Such NCCs are prepared in various exemplary embodiments.

Terms such as powder, sheet, paste, or slurry are used herein to refer to a particular state of the PI precipitate as the carbon precursor. Use of the terms powder, fiber, and thin film does not indicate, however, that the PI particulate must be dry or in any particular environment. Although the PI can be prepared in a dry state before mixing, the PI may also be in a wet environment, such as in a paste or slurry.

In a first aspect, the invention provides a method for preparing the nanoporous carbon composites (NCC). NCC comprises a nanoporous carbon phase derived from a PI precipitate as carbon precursor and other phases of active electrode material and additive in the form of particles or fibers.

Most exemplary embodiments of the present invention are prepared in accordance with one of the NCC preparation procedures as shown in FIGS. 1-3. The three preparation procedures differ mainly in how and when the solid ingredients are added during the polyimide preparation. The differences occur mostly in the first two or three steps.

In NCC Preparation Procedure 1 of FIG. 1 (1000), a PI precipitate in a reaction solvent is prepared (1100) followed by adding the solid ingredients to the PI precipitate in the presence of the reaction solvent (1200). The subsequent steps are divided into two sub-procedures. In one sub-procedure, the wet mixture is calendered into a sheet (1310) before the reaction solvent is removed by distillation (1410). In another sub-procedure, the reaction solvent is removed by distillation to produce PI coated solid ingredients (1320). The following optional milling and compression of the dry PI coated solid ingredients produces a monolith or pellets (1420). In the case that NCC final product is secondary particles, the compression of the PI coated solid ingredients under pressure may not be necessary. In such a case, the solvent removal (1320) and the consolidation of the solid ingredients may be combined into one step.

In NCC Preparation Procedure 2 of FIG. 2 (2000), the solid ingredients are added to the poly(amic acid) solution or to a monomer solution for preparing poly(amic acid) so that the preparation of poly(amic acid) and addition of the solid ingredients are incorporated within one step (2100). The following imidization of the poly(amic acid) produces precipitation of PI onto the solid ingredients, producing a wet paste of PI precipitate, solid ingredients, and reaction solvent (2200). Similar to the procedure 1 (1000), the subsequent steps are divided into two sub-procedures. In one sub-procedure, the wet paste is calendered into a sheet (2310) before the reaction solvent is removed by distillation (2410). In another sub-procedure, the reaction solvent is removed by distillation to produce PI coated solid ingredients (2320). The following optional milling and compression of the dry PI coated solid ingredients produces a monolith or pellets (2420). Also, in the case that NCC final product is secondary particles, the compression of the PI coated solid ingredients under pressure may not be necessary.

In NCC Preparation Procedure 3 of FIG. 3 (3000), a PI powder is prepared by imidization of a poly(amic acid) (3100) followed by distillation to remove the reaction solvent (3200). In one sub-procedure, the solid ingredients are mixed with PI dry powder to form a uniform mixture (3310), the mixture is then compressed into a monolith or pellets (3410). As an option, the PI powder is thermally annealed at 150C-300C before being mixed with the solid ingredients (before 3310 step). In another sub-procedure, a solvent is added to the PI powder to form a PI wet paste or slurry (3320) before mixing the PI with the solid ingredients (3420).

Because some of the residue functional groups, such as carboxylic acid and amide, remain in the PI chain, PI precursor is relatively hydrophilic. Water may be used as the solvent for making PI paste. For the purpose of further increasing the hydrophilicity of the PI powder, an alkali base, such as lithium carbonate ($Li_2CO_3$) or potassium hydroxide (KOH), may be added to the water to make an aqueous solution for making the PI more compatible with the water, leading to a more relaxed PI polymer chain structure in the aqueous solution, therefore enhancing a uniform coating of polyimide on the solid ingredients. The molar ratio of the alkali base to repeat PI unit is preferably in the range of 1:3 to 1:6. For example, when PI is prepared from pyromellitic dianhydride (PMDA) and 1,4-phenylene diamine (PPD), the repeat PI molar unit is made from one PMDA molecule and one PPD molecule. In such a case, the molar ratio of the alkali base to the repeat unit of PI is same as the molar ratio of the alkali base to PMDA.

Alternatively, a non-nucleophilic amine, such as triethylamine, may take place of the alkali base to be added to the water before adding the PI powder. The amine reacts with the residue carboxylic acid in the PI chain to be converted to an ammonium cation while the carboxylic acid is converted to a carboxylate anion. Furthermore, because the non-nucleophilic amine is a catalyst for imidization of the poly(amic acid), the amine addition may be carried out in two steps. A portion of the amine is added to the poly(amic acid) during the imidization in a first step and a second portion of the amine is added to the aqueous PI paste or slurry in a second step.

Furthermore, the non-nucleophilic amine and the alkali base may be used in combination for making a PI paste in water. For example, a small portion of triethylamine is added to the poly(amic acid) during the imidization process (3100) and a portion of the alkali base is added to water before adding the PI powder to form a PI paste (3320).

The following process steps (3521-3721 and 3522-3722) in NCC Preparation Procedure 3 are similar to the sub-procedures in FIG. 1 or 2 (1310-1510 and 1320-1520, or 2310-2510 and 2320-2520). Thus, in one sub-procedure (3521-3721), the wet mixture is calendered into a sheet (3521) before removing the solvent (3621). In another sub-procedure (3522-3722), the solvent is removed from the wet mixture by distillation to form PI coated solid ingredients (3522) followed by optional milling and compression of the solid mixture to produce a monolith or pellets (3622).

Optionally, the PI coated solid ingredients are thermally annealed at 200C-350C, preferably under vacuum, before being consolidated into a monolith or pellets (before 1420, 2420, or 3622).

The carbonization as the last step in all of the NCC preparation procedures (1510, 1520, 2510, 2520, 3510, 3721, or 3722) is carried out under an inert atmosphere, such as argon or nitrogen, at a temperature range of 450C-3500C, more preferably in the range of 500C-1500C to produce NCC.

The poly(amic acid) is prepared by mixing an aromatic dianhydride and an aromatic diamine in an organic solvent, such as NMP, at ambient temperature to form poly(amic acid). As an option, acetic acid (AA) may be added to the poly(amic acid) as a catalyst.

The imidization of poly(amic acid) in the reaction solution (1100, 2200, or 3100) is by either chemical imidization or thermal imidization. The thermal imidization is conducted at an elevated temperature, preferably at or above 150C, with strong agitation to form PI precipitate. In some embodiments, the chemical imidization reaction may be conducted by adding an organic base, such as triethylamine or pyridine, to the poly(amic acid) solution at ambient temperature. The PI precipitate in the reaction solvent is in a state of wet paste with polymer chains suspended in the solvent. The solvent is removed by distillation at an elevated temperature, preferably under vacuum, produces fine PI powders (3200) while the solvent is removed in the presence of solid ingredients to produce PI coated solid ingredients (1320, 2320, or 3522).

In some embodiments, the PI as carbon precursor is prepared from pyromellitic dianhydride (PMDA) and 1,4-phenylene diamine (PPD) in NMP solvent to produce a non-melting PI precipitate with a rigid chain structure, which remains in solid state before reaching carbonization temperature at around 500C-550C. The non-melting property of the PI as a carbon precursor has merits of preventing polymer chain collapse during the carbonization. It is known that the polymer melting may lead to formation of macropores instead of nanopores or micropores. Also, dissolution of the active electrode material may occur in the polymer melt, leading to decomposition or redox reaction of the active electrode material during the carbonization process.

For non-melting PI with a rigid linear chain structure, some residual amide and carboxylic acid groups remain in the polymer chain after the imidization process due to incomplete imidization caused by steric hindrance which restricts polymer chain mobility. Continuous chemical reactions of the PI, including continuous imidization, polymer chain extension, and cross-linking reaction, proceed in the solid state at elevated temperatures during the initial stage of the carbonization process (1510, 1520, 2510, 2520, 3510, 3721, or 3722). Decomposition of PI under an inert atmosphere starts around 500-550C, which begins the PI carbonization.

Because of the rigid linear polymer chain structure, the PI's chain segments tend to align with each other during the imidization of poly(amic acid) followed by precipitation (1100, 2200, or 3100). The induced shear stress during the subsequent processes, such as mixing the PI precipitate with solid ingredients (1200, 2200, 3310, or 3420), may further align the PI segments to form aligned PI chain structures. The carbonization converts the aligned PI chain structure into a fibrillar carbon morphology. Depending on the processing condition and chemical composition of the PI, the porous carbon morphology derived from the PI is selected from a group including fibrillar, amorphous, semicrystalline, or a combination thereof.

The PI precipitate before carbonization does not possess nanoporous structure. The nanoporous carbon phase is developed during the carbonization, which results from the rigid polymer chain structure, linear chain segment alignments, non-melting behavior before reaching the carbonization temperature, and continuous solid state chemical reaction of the PI. Thus, the average pore size of the nanoporous carbon phase is determined by the carbonization condition, PI composition in NCC, and the processing condition.

In one example, a carbon disk was prepared from the PI powder using monomers of PMDA and PPD, following steps of 3100, 3200, 3310, 3410, and 3510 in NCC Preparation Procedure 3. The carbon disk diameter shrank from the original 1 inch before to about 0.62 inch after carbonization, having 30%-40% linear shrinkage and roughly 50% weight loss for the carbonization conducted at 800C under a nitrogen atmosphere. The average pore size was 1-2 nm, the specific surface area was over 800 m2/gram, and the density was around 0.85 gram/cc.

The solid ingredients may include an ingredient that is initially a liquid composition mixed with the PI precipitate (1200 or 3420). Said liquid composition is converted to a solid form, such as particle or fiber, at completion of either the mixing or consolidation process before starting the carbonization process (for example, 1320-1420, 2320-2420, and 3420-3522-3622). For example, when a mixing process of solid ingredients and PI precipitate is conducted in the presence of a solvent (such as 1200, 2100-2200, or 3420), some ingredient might be soluble in the solvent. At completion of the mixing and solvent removal, the dissolved ingredient is recovered to the solid form in the mixture. In another example, an active electrode material is derived from a precursor compound which is dissolved in a solvent. The precursor compound in solution is mixed with the PI precipitate in the presence of the solvent (such as 1200 or 3420). After a chemical reaction, the precursor compound is converted to active electrode nanoparticles grown on the PI precipitate during the process of making NCC based composite (1320-1420, or 3420-3522).

The NCC may be in the form of a monolith with a desired shape, such as a plate, a foil, a rod, a continuous film, a tube, or a hollow structure, or in the form of pellets or secondary particles.

In the case of making secondary particles, a wet paste of PI precipitate containing solvent and solid ingredients are well mixed (1200, 2200, or 3420) followed by removing the solvent, preferably under a vacuum (1320, 2320, or 3522). As an option, the solvent removal is followed by milling to get desired particle sizes (1420, 2420, or 3622). Here, the secondary particle is defined by an aggregate of primary particles. When the NCC product is in the form of secondary particles, a separate step of consolidation of solid ingredients under pressure may not be necessary. In such a case, the solvent removal and the consolidation may be combined into one step. In the case of making pellets, the solvent removal may optionally be followed by thermal annealing, milling, and pelletization (1420, 2420, or 3622).

For making monolithic NCC, the consolidation is carried out either with participation of a solvent (1310-1410, 2310-2410, or 3521-3621) or without participation of a solvent (1320-1420, 2320-2420, 3310-3410, or 3522-3622). In one approach, the mixture in the presence of a solvent in the form of a wet paste is calendered into a sheet before a drying process under vacuum to remove the solvent. In an alternative approach, the mixture is vacuum dried at an elevated temperature, such as 150C, to form PI coated solid ingredients before being compressed at ambient temperature to a monolith. Yet, in another approach, a PI dry powder and the solid ingredients are mixed, optionally followed by milling, to form a uniform mixture before being compressed (3310-3410). In the compression process, the dry mixture is placed in a mold or on a substrate before a compression pressure is applied.

The consolidation of the PI and the solid ingredients is usually carried out at ambient temperature in which the mixture is in the form of either dry powder mixture or wet paste. Other temperatures may be used as long as the consolidation temperature is below melting temperature of the PI.

The methodology of preparing NCC is referenced from U.S. Pat. No. 8,414,805B2 and U.S. Pat. No. 7,919,024B2 where the PI powder is used as carbon precursor. More particularly, a non-melting PI is used as carbon precursor, which does not melt before reaching the carbonization temperature of 500C-550C.

In some exemplary embodiments for making NCC based monolith or pellets, particularly when a fiber ingredient is in the NCC composition, the carbon phase derived from PI may comprise a bimodal pore size distribution. As shown in FIG. 6, the NCC includes a nanoporous carbon phase (116) to bind the active electrode particles (108) and the fibrous additive (120) with each other and micro-cracks (112) distributed among the active electrode particles (108), forming a 3D network. When PMDA and PPD are used for making PI precipitate as the carbon precursor, the nanoporous carbon phase (116) has an average pore size around 1 nm to 2 nm and a narrow pore size distribution with a width of pore size distribution not more than 50 nm when the carbonization is conducted at 750C-800C under an inert atmosphere (FIG. 4).

The micro-cracks of NCC are formed during the carbonization due to shrinkage of the nanoporous carbon phase derived from PI while overall shrinkage of NCC is obstructed by the solid ingredients.

The scale of micro-cracks is a function of the size of solid ingredients, chemical composition of PI, composition of NCC, and carbonization condition. For example, when the mass ratio of PI in NCC is sufficiently low to form only a thin binding layer between the particles in the solid ingredients, such that parts of the particles are more nearly in physical contact with each other, the scale of micro-cracks is in the order of particle sizes. When the mass ratio of PI in NCC is sufficiently high such that the PI forms a continuous phase to encapsulate individual particles in the solid ingredients, there may not be obvious micro-cracks in NCC. However, when a small percentage of short activated carbon fibers with average length in the range of 0.2-1.0 mm is incorporated to limit the NCC shrinkage while the PI composition in NCC is relatively high, the scale of micro-cracks may reach hundreds of microns. In such a case, the micro-cracks tend to occur on the interfaces of fiber due to relatively weak binding of the nanoporous carbon phase to the fiber surfaces.

The micro-cracks are normally formed on the interfaces of solid particles or fibers. As a result, a micro-crack tends to be bounded in one or more parts by a facing surface of the solid particle or fiber. The facing surface of the solid ingredient to the micro-crack may comprise carbon derived from the PI, which becomes a part of the facing surface. Because micro-cracks are desirable for NCC to facilitate electrolyte diffusion within the electrode, the material composition of NCC, PI content, average sizes of solid particles or fibers, and processing condition may be formulated for making micro-cracks with desired dimensions and distribution.

Various fibers, such as activated carbon fibers, carbonized organic polymer fibers, and inorganic fibers, are among the candidates for additives to be incorporated in NCC. The fibers have merits of introducing flexibility, increasing compression strength, and adjusting both the micro-crack distribution and average size in NCC. For example, because the micro-cracks tend to form on the interfaces of solid particles or fibers, a fiber with relatively weak binding property may be selected to facilitate relatively large micro-cracks. When a carbonized or partially carbonized organic fiber, such as polyimide nanofiber, is used as an additive, the carbonization of the organic fiber under an inert atmosphere may be carried out such that the carbonized fiber still possesses a reduced functionality of the organic fiber that is binding to the nanoporous carbon phase yet not as binding as active electrode material, therefore facilitating micro-crack growth on the fiber interface. The mass ratio of fiber in the overall NCC composition is in the range of 1 to 7%, more preferably in the range of 1-3%.

The fibers may be in the forms of short fibers with length in the range of 0.2 mm-1 mm, non-woven fiber pad, or a combination thereof.

The organic polymer fibers for NCC, particularly those in the form of nano-fiber prepared by electrospinning, include fibers prepared from PI, polyamides (Nylon), para-aramid (Kevlar), polyacrylonitrile (PAN), polyaniline, polythiophene, bacterial cellulose, etc. The organic polymer fibers are to be carbonized before being incorporated to the NCC preparation process.

As an option, some solid ingredients, such as graphite, graphene, and graphene oxide, prepared with relative weak binding property compared to active electrode particles may be added for the purpose of formulating the micro-cracks in NCC.

The active electrode material in the form of particles have particle sizes in the range of 0.005 to 30 microns, preferably in the range of 0.005 to 0.5 microns.

One application of NCC based composites is to apply PI derived nanoporous carbon phase as a binder to bind active electrode particles with each other to form secondary particles or pellets. The outer surfaces of the secondary particles or pellets are covered at least partially by a nanoporous carbon layer which may effectively protect the particle surface against the electrolyte. At relatively low PI composition, NCC based pellets or secondary particles may comprise micro cracks developed among the solid ingredients. For aqueous electrolyte-based batteries, a nanoporous carbon phase in the secondary active anode particles may function as a hydrogen gas adsorption buffer.

Another application of NCC based composites is preparation of NCC based monolithic electrodes, in which a nanoporous carbon phase replaces conventional polymer binder. A micro-crack derived 3D network in NCC may effectively reduce the electrolyte diffusion resistance, making relatively thick battery electrodes feasible for Li-ion and other batteries. Also, the nanoporous carbon binder provides increased thermal stability and chemical stability of the electrode, which facilitates a process of coating with or infiltration with a solid electrolyte for building a solid-state Li-ion battery.

Generally, NCC based electrode materials lead to low electrolyte diffusion resistance, relatively low carbon content, and low manufacturing cost in comparison with other porous carbon-based composites incorporating active electrode materials. The applications of NCC include, but are not limited to, use as electrodes, or active electrode materials, or as a combined electrode and current collector for electrochemical devices, including supercapacitors, batteries, fuel cells, sensors, capacitive desalination devices, among other uses.

In a first embodiment, monolithic sulfur—carbon (S—C) composite is prepared for use as cathode for Li—S batteries. The S—C composite preparation comprises following steps, referencing from NCC Preparation Procedure 1:

Step 1: preparing activated carbon-carbon composite (AC-C composite) in the form of secondary particles. The starting materials for this step include activated carbon (AC) powder with specific surface area around 1000 m2/g, activated carbon fiber, elemental sulfur, and PI precipitate. The mass ratio of the activated carbon to PI precipitate is in the range of 85:15 to 80:20.

The poly(amic acid) is prepared from PMDA and PPD monomers at 1:1 molar ratio in NMP solvent to produce a viscous solution at ambient temperature. The monomer concentration is about 7-12% by mass. As an option, acetic anhydride (AA) with a molar ratio of 0.2 to 2.0 to PMDA is added to the poly(amic acid) solution. The poly(amic acid) is thermally imidized at or above 150C to form PI precipitate (1100). AC powder is added to the PI precipitate in the presence of the NMP solvent (1200). The mixture is blended thoroughly to have individual AC particles coated with a thin layer of PI. The NMP solvent is removed by vacuum distillation at an elevated temperature (1320). Optionally, the PI coated AC secondary particles are further milled to an average particle size at submicron or micron scale. The carbonization is conducted under an inert atmosphere, such as argon, at 750C-800C for two to three hours (1520). AC-C composite product comprises a nanoporous carbon phase with 1-2 nm average pore size to cover at least partially the outer surfaces of the AC-C secondary particles. The specific surface area of the AC-C secondary particles is essentially same as the specific surface area of the AC powder.

Step 2: vacuum infusion of sulfur into the AC-C composite. The mass ratio of sulfur to AC-C is in the range of 30% to 80%, which is determined by the pore volume of the AC-C secondary particles. The elemental sulfur and AC-C particles are ball milled with ⅛" steel ball media for 0.5 hour to form a homogeneous mixture. The resulting mixture is transferred to a reaction vessel, which is equipped with a thermal heating jacket and connected to a vacuum system. The vessel is evacuated for one hour after achieving a vacuum below 100 mtorr and then it is sealed. The vessel is heated to 110C and then to 150C for one hour while under vacuum. The vessel is cooled to ambient temperature and released to ambient pressure. The sulfur infused AC-C particles are decanted from the vessel followed by further milling for 0.5 hour to be homogenized.

Step 3: preparing NCC based S—C composite in the form of a monolith. The starting materials for this step include sulfur infused AC-C secondary particles prepared in Step 2, activated carbon short fiber of 0.2-1 mm length, and a wet paste of PI precipitate in NMP reaction solvent. The mass ratio of PI in the dry mixture is in the range of 18% to 25%. The starting materials are well blended to form a homogeneous mixture (1200). The wet mixture is calendered into a sheet followed by removing NMP solvent under vacuum at an elevated temperature (1310-1410). Alternatively, the solvent is removed before calendering the wet mixture (1320-1420). The dried mixture of discrete particles is placed in a mold to be pressed to a sheet under a compression pressure. As an option, the dry mixture is milled to be homogenized before the consolidation (1420). The dried sheet is carbonized under an inert atmosphere, such as argon, at 500C-600C, yielding monolithic S—C composite for use as cathode for Li—S batteries (1520).

In an alternative approach to Step 3, the PI precipitate in NMP reaction solvent is replaced by PI precipitate in Li2CO3 aqueous solution as one of the starting materials (3000). In this approach, NMP in the PI precipitate is removed by vacuum distillation, yielding PI powder (3200). An aqueous Li2CO3 solution is prepared by dissolving Li2CO3 in water. The Li2CO3 is 2% to 4% by mass of the PI precipitate, corresponding to the molar ratio of Li2CO3 to PI repeat unit in the range of 1:3 to 1:6. The PI powder is added to the Li2CO3 solution to form a wet paste of PI (3320). The remainder of the procedure is conducted as in NCC Preparation Procedure 3 following the step of mixing the PI paste with the solid ingredients (3420-3521-3621-3721 or 3420-3522-3622-3722).

Because the carbonization of PI is conducted at 500C-600C, some residue nitrogen and oxygen in the nanoporous carbon phase may facilitate formation of S=O or S—N links between the sulfur and carbon phases.

The monolithic S—C composite can provide the following features: 1) a nanoporous carbon phase, binding sulfur infused AC-C secondary particles with each other and functioning as a binder to replace conventional polymer binder; 2) the nanoporous carbon phase encapsulating the outer surfaces of the AC-C secondary particles; 3) the nanoporous carbon phase being electronically conductive and affinitive to both sulfur and polysulfide to inhibit diffusion of the polysulfide from cathode to anode; 4) microcracks distributed throughout the composite, forming a 3D network to facilitate fast Li diffusion.

In some embodiments, other solid ingredients, such as graphene oxide or reduced graphene oxide, may be incorporated with NCC for the purpose of further formulating the size and distribution of micro-cracks. Also, other carbon fibers, such as carbonized PI nano-fiber, may replace activated carbon fiber to be incorporated with NCC based S—C monolithic composite.

Other porous carbon containing materials may also be used as starting material to replace activated carbon powder for making S—C composite as cathode material for Li—S batteries. Such porous carbon containing materials include carbon black such as super P carbon black (SPCB), mesoporous carbon such as CMK-3, hollow carbon spheres, carbon aerogel particles, carbon nanotubes, hollow carbon nanofibers, graphene or graphene oxide, etc.

In one embodiment, in which another porous carbon material, such as Super P carbon black (SPCB), replaces activated carbon powder as the starting material for making S—C monolithic composite, the Step 1 process in the previous embodiment may be eliminated. Instead, the S—C monolithic composite is prepared according to Step 2 and Step 3 in the first embodiment.

Furthermore, other active cathode materials or solid electrolyte materials in addition to carbon may be incorporated into the S—C composite for use as cathode materials for Li—S batteries. The other active electrode materials include metal nitride, metal oxynitride, metal oxide, titanium oxide, and silica, etc. The metal nitride and metal oxynitride may comprise titanium. The solid electrolyte materials include lithium aluminum germanium phosphate (LAGP), lithium Super Ionic Conductor (LISICON), or glassy solid electrolytes. One of the methods of incorporating the other active cathode materials or solid electrolyte materials into S—C composite is simply mixing the other active electrode particles or solid electrolyte particles with the sulfur infused porous carbon particles before being mixed with the PI precipitate and other ingredients. The remainder of the process is conducted according to Step 3 in the first embodiment, NCC technology may be used to make silicon-carbon (Si—C) composite as anode material for Li-ion batteries. In one embodiment of making Si—C composite, the starting materials include silicon nanoparticles and PI precipitate as carbon precursor. The preparation process is referenced from NCC Preparation Procedure 2. In the process, silicon nanoparticles and a small percentage of silane coupling agent (3% by mass of the silicon nanoparticles) are added to N, N'-dimethyl acetyl amide (DMAc) followed by ultrasound stirring for 10-15 hours. Then, PPD is added to this reaction solution containing silicon nanoparticles at ambient temperature. The solution is continuously stirred until PPD is completed dissolved. Under the stirring, PMDA with equal molar ratio as PPD is added to the reaction solution, of which the addition is divided equally in 4 steps. The mass ratio of PI to silicon nanoparticles is in the range of 1:1 to 4:1. The reaction is carried out at ambient temperature for 2-3 hours until a viscous solution of poly(amic acid) is formed (2100). As an option, acetic anhydride is added as a catalyst.

The imidization is carried out at an elevated temperature around 150C-160C to form PI precipitate coated silicon aggregates (2200). As an option, graphene oxide or reduced graphene oxide in the range of 3% to 5% of the total mass is used as another solid ingredient. The DMAc solvent is removed by vacuum distillation (2320). As another option, the dried PI coated silicon aggregates are milled to a desired average particle size (2420). The following carbonization under an inert atmosphere is conducted in the temperature range of 600C to 1500C. The micro-cracks among the Si—C nanocomposite particles may facilitate a decreased electrolyte diffusion resistance.

Other silicon containing materials may also be used as starting material for making Si—C composite using NCC technology, such as carbon-coated silicon, silicon-coated carbon, carbon doped with silicon, or silicon doped with carbon.

For making monolithic Si—C composite, the consolidation of the mixture comprising PI coated silicon aggregates and other ingredients may be carried out either before or after the solvent removal by distillation under vacuum (2310-2510 or 2320-2520). For example, in one approach, the PI coated silicon aggregates in the presence of DMAc reaction solution is calendered into a sheet followed by removing the DMAc solvent under vacuum at an elevated temperature (2310-2410). In another approach, the DMAc solvent is removed from the PI coated silicon aggregates by vacuum distillation (2320). The dry mixture may be compressed in a mold under a pressure (2420). The carbonization is carried out at a temperature range of 800C-1100C under an inert atmosphere (2510 or 2520). As an option, a small percentage of short fibers, such as activated carbon fiber, or carbonized PI nano-fiber, or carbon nanotube, may be used as a third solid ingredient for NCC based Si—C composite for the purpose of introducing flexibility and formulating micro-cracks to the NCC based silicon-carbon composite.

The Si—C composite in the form of a flexible monolithic sheet may be used as a binderless anode for Li-ion batteries.

Lithium metal phosphates with a general formula of LiMPO4 in the form of nano- or micro-particles, where M represents at least one transition metal, such as Mn or Fe, may be used as active cathode material for lithium-ion batteries. The active electrode particles coated with carbon and/or bonded to one another via carbon bonds provide enhanced electronic conductivity in the electrode. NCC of the present invention may apply non-melting PI prepared from PMDA and PPD monomers as carbon precursor to produce NCC based LiMPO4-carbon composite having a bimodal pore size distribution, including nanopores to encase the LiMPO4 particles and micro-cracks among the active electrode particles.

In an embodiment for making monolithic LiFePO4-carbon composite for use as binderless cathode for Li-ion batteries, either LiFePO4 powder or a commercial carbon-coated LiFePO4 powder is used as starting material. In one approach, the LiFePO4 powder is mixed with the PI precipitate in the reaction solution to form a paste (1200). Rest of the procedure follows steps 1310, 1410, and 1510 in the NCC Preparation Procedure 1. In another approach, the PI precipitate in the form of dry powder is added to an aqueous Li2CO3 solution to form a wet slurry (3320), then the LiFePO4 powder is added to form a slurry of PI—LiFePO4 (3420). The slurry is calendered into a sheet followed by removing the water and carbonization under an inert atmosphere at 600C-800C (3521-3621-3721). Alternatively, the water is removed from the slurry (3522) followed by subsequent steps including milling to form a uniform PI coated LiFePO4 powder mixture, consolidation under compressional pressure, and carbonization (3622-3722).

For making flexible monolithic LiFePO4-carbon composite, a small percentage of short fiber, such as activated carbon fiber or carbonized PI nanofiber, is added as another solid ingredient. In the case of making pellets of NCC based LiFePO4-carbon composite, carbon nanotubes, graphite, or graphene oxide may be used as a solid ingredient. One of the purposes of adding such solid ingredients is to formulate micro-cracks to facilitate fast electrolyte diffusion in the electrode.

The ternary material Li (Ni 1-x-y Co x Mn y) O2 (NMC), where $0<x\leq0.4$ and $0<y\leq0.4$, in the form of spherical pellets is one of the common active cathode materials for lithium-ion batteries. NMC primary particles, prepared based on a solid-state reaction, are ground and pelletized, pre-calcinated, reground, pelletized, and then calcinated to form NMC spherical secondary particles as Li-ion battery cathode material. Before the second stage of pelletization, the NMC primary particles may be coated with a layer of PI as carbon precursor using NCC technology. The following pelletization and calcination produces NMC pellets comprising agglomerated primary particles coated with a nanoporous carbon coating.

The preparation of NMC-carbon composite may be conducted according to the same procedure for making LiFePO4-carbon composite. For example, a paste of non-melting PI precipitate in the presence of the reaction solvent is mixed with NMC primary particles thoroughly to cover the particle surface with a layer of PI coating (1200). The solvent is removed from the mixture by vacuum distillation at an elevated temperature (1320). The dried mixture is ball milled before being pelletized (1420). The calcination is conducted under argon at 550C-600C, producing NMC pellets comprising carbon coated primary particles (1520). As another option, an additional calcination of NMC pellets may be conducted in air at 500C-700C for 0.5-10 hours.

Because of a redox reaction of metal oxide with carbon, the carbon in the contact interface among the primary particles may be fully decomposed during the calcination process, leading to fused NMC primary particles and a nanoporous carbon coating on the outer surfaces of particles exposed to the inert atmosphere.

There are other Li-ion cathode materials, such as 0.5Li2MnO3-0.5LiNi0.44Co0.25Mn0.31O2 (LMR-NMC), and LiCoO2 (LCO). The procedure of preparing NCC based WC-carbon composite may be applied to make NCC based carbon composites of LMR-NMC and LCO as Li-ion cathode materials.

Iron oxides (FeO, $Fe_3O_4$) or reduced iron oxides are candidates for active electrode material for lithium-ion batteries or active anode material for aqueous electrolyte-based batteries. It is desirable to coat the iron oxide particles with a porous carbon layer to bind the active particles with one another via carbon bonds to enhance electron transport in the electrode. In the case of iron oxides or reduced iron oxides used as active anode material for aqueous electrolyte-based batteries, the carbon layer bound to the surface of iron oxides particles may facilitate hydrogen adsorption, therefore, reducing hydrogen gas evolution. Iron oxides-carbon composite may then be made in the form of secondary particles, pellets, or monolithic plates.

In one embodiment for making iron oxide-carbon composite, the procedure comprises steps of: mixing the PI precursor, iron oxide powder, optionally graphite or graphene oxide, and optionally activated carbon fiber; consolidating the mixture; and subjecting the consolidated mixture to carbonization at a temperature in the range of 500C-600C under an inert atmosphere. The preparation procedure may be conducted according to NCC Preparation Procedures 1, 2, or 3.

In a second aspect, the present invention provides an electrochemical device comprising at least one electrochemical cell. The electrochemical cell comprises at least two electrodes, two current collectors, a separator positioned between the electrodes, and electrolyte impregnating the pores of electrodes and separator, wherein at least one of the electrodes comprises NCC. Optionally, monolithic NCC functions both as an electrode and a current collector.

EXAMPLES

Example 1, Preparation of NCC Based Activated Carbon-Carbon (AC-C) Composite in the Form of a Disk The AC-C composite was prepared from the PI precipitate in powder form as the carbon precursor and the activated carbon powder (specific surface area: 1000 m2/g). The mass ratio of PI to activated carbon was 80:20. The preparation was conducted according to NCC Preparation Procedure 3 in FIGS. 3 (3100-3200-3310-3410-3510).

The PI powder was prepared from pyromellitic dianhydride (PMDA) and 1,4-phenylenediamine (PPD) in a 1:1 molar ratio. The synthesis was conducted by dissolving PPD (3.35 g, 0.031 mole) in 120 ml of N, N-dimethylacetamide (DMAc) to form a 3-wt. % solution. While stirring, PMDA (6.77 g, 0.031 mole) was gradually added to the PPD solution. After PMDA was fully dissolved, the reaction was carried out with stirring at ambient temperature until a viscous solution was formed. The reaction temperature was gradually raised above 150C with agitation to produce the PI precipitate. The reaction solvent was distilled off under vacuum at an elevated temperature to yield PI dry powder.

PI powder (0.40 g) and activated carbon powder (0.049 g) in an 8:1 mass ratio was mixed and milled to form a uniform mixture. The powder mixture was placed in a mold and compressed under 5000 psi pressure at ambient temperature to produce a monolithic disk with 1.0 mm thickness. The disk was carbonized at 800C for three hours under argon atmosphere.

The apparent density of porous carbon disk was 0.65 g/cc. A sample of the carbon disk was measured the average pore size and pore size distribution by Brunauer-Emmett-Teller (BET) adsorption method. The result is shown in FIG. 4. As shown, the average pore size was around 1.8 nm and the width of pore size distribution was about 50 nm. Because the polyimide lost about 50% mass, the AC-C composite consisted of 33% of activated carbon powder and about 67% of the porous carbon phase derived from the PI. Thus, some of the pore size and pore size distribution was contributed by the activated carbon powder.

Example 2, Preparation of NCC Based Activated Carbon-Carbon (AC-C) Composite in the Form of a Thin Flexible Carbon Sheet The AC-C composite was prepared from PI precipitate in the reaction solvent as the carbon precursor and the activated carbon powder (specific surface area: 1000 m2/gram) as the active electrode ingredient and activated carbon fiber (length: 0.2-1.0 mm range) as another solid ingredient. The mass ratio of PI to activated carbon was 18:82 while the mass ratio of the carbon powder to fiber was 27:1. The preparation was conducted according to NCC Preparation Procedure 1 (1100-1200-1310-1410-1510) in FIG. 1.

The PI was prepared from pyromellitic dianhydride (PMDA) and 1,4-phenylenediamine (PPD) in a 1:1 molar ratio. The synthesis of PI precipitate in solution was prepared by dissolving PPD in N-methyl-2-pyrrolidone (NMP) to form a 3.0-wt. % solution. While stirring, PMDA was gradually added to the PPD solution. After PMDA was fully dissolved, the reaction was carried out with stirring at ambient temperature until a viscous solution was formed. The reaction temperature was gradually raised above 150C with agitation to produce the PI precipitate. After the synthesis of PI, the concentration of PI precipitate in the reaction solvent was about 7.5-wt. %. 4.53 grams of PI precipitate in the reaction solvent was taken to a 20 ml glass beaker. The PI mass in the solvent was 0.34 grams. 1.5 grams of activated carbon powder was added to the PI/solvent, and 0.055 grams of activated carbon fiber was milled to have the average fiber length less than 1 mm before being added to the wet mixture. The activated carbon powder and fiber were added to the PI precipitate in reaction solvent to form a thick paste. The paste was uniformly blended before being calendered into a thin sheet about 0.25 mm thick. The solvent in the sheet was removed by vacuum distillation above 100C. The carbonization of the sheet was conducted at 800C for two hours under an argon atmosphere.

The carbon sheet of AC-C composite was flexible and its density was 0.55 g/cc. Because the PI lost about 50% mass during the carbonization, the carbon phase derived from PI in AC-C composite was about 10% by mass. The conventional activated carbon electrodes are usually assembled by using 10% organic polymer binder to bind activated carbon powder into a sheet. In comparison, 10% porous carbon phase derived from the PI in AC-C carbon electrode replaced 10% organic polymer binder to bind activated carbon powder into a monolith for use as electrodes.

Multiple samples in the shape of a round disk with one inch diameter were cut from the sheet to be used as electrodes which were assembled into supercapacitor cells.

Impedance spectrum of an AC-C carbon electrode sample was measured in comparison with the impedance spectra of conventional activated carbon electrode samples using tetraethyl ammonium tetrafluoroborate/acetonitrile as organic electrolyte. The result was shown in FIG. 5. As shown in FIG. 5, the Z' (0 Hz) at near zero frequency of the AC-C sample was about 0.35 Ohm in comparison with 2.5 Ohm Z' (0 Hz) of the conventional carbon electrode with roughly same thickness and comparable specific capacitance.

The low Z' (0 Hz) of the AC-C carbon disk was contributed by the micro-cracks of the AC-C electrodes, which were distributed throughout the porous carbon sample, effectively reducing the electrolyte diffusion resistance.

What is claimed is:

1. A nanoporous carbon composite for use as an electrode material, comprising:
    a) a nanoporous carbon phase derived from a polyimide precipitate, wherein the polyimide precipitate is prepared from imidization of a poly (amic acids) solution, the solution including a reaction solvent;
    b) active electrode material;
    c) one or more additives in the form of particles, fibers, or a combination thereof, wherein pieces of the active electrode material and pieces of the additive are bound with one another by the nanoporous carbon phase; and
    d) micro-cracks distributed throughout the nanoporous carbon composite, wherein the micro-crack is bounded in one or more parts by a surface of the active electrode material or the additive and the micro-cracks are interconnected in a three-dimensional network (3D).

2. The nanoporous carbon composite of claim 1, wherein at least one dimension of the micro-crack is comparable to or larger than a particle size of the active electrode material or the additive.

3. The nanoporous carbon composite of claim 1, wherein the nanoporous carbon composite is in a form selected from monolithic sheet, bulk with a desired shape, pellets, or secondary particles.

4. The nanoporous carbon composite of claim 3, wherein the nanoporous carbon composite in the form of the monolithic sheet functions as both an electrode and a current collector.

5. The nanoporous carbon composite of claim 1, wherein the surface of the active electrode material or the additive facing to the micro-crack comprises the nanoporous carbon derived from the polyimide precipitate.

6. The nanoporous carbon composite of claim 1, wherein the additive in the form of the fibers is selected from a group including activated carbon fiber, carbonized or partially carbonized organic fibers, and inorganic fibers.

7. The nanoporous carbon composite of claim 6, wherein the organic fiber is prepared from an organic polymer selected from a group including polyimides, para-aramid (Kevlar), polyamide (Nylon), polyacrylonitrile (PAN), polyaniline, polythiophene, and bacterial cellulose.

8. The nanoporous carbon composite of claim 1, wherein an average pore size of the nanoporous carbon phase is in a range of 0.5 nm to 4 nm.

9. The nanoporous carbon composite of claim 1, wherein a morphology of the nanoporous carbon phase is selected from fibrillar, amorphous, semicrystalline, or a combination thereof.

10. The nanoporous carbon composite of claim 1, wherein a mass ratio of the nanoporous carbon phase in the composite is in a range of 7% to 85%.

11. The nanoporous carbon composite of claim 1, wherein the nanoporous carbon phase derived from the polyimide precipitate has at least 300 m2/gram specific surface area when a carbonization of the polyimide is conducted at a temperature range of 700C-1000C under an inert atmosphere.

12. The nanoporous carbon composite of claim 1, wherein the active electrode material is selected from a group including various carbons, sulfur, silicon, silicon oxides, lithium metal phosphate compounds, metal oxides, lithium metal oxides, metal sulfides, metal nitrides, titanium oxides, titanates, and a combination thereof, wherein various carbons include graphite, graphene, graphene oxide, carbon nanotube, carbon black, and activated carbon, wherein the lithium metal phosphate compounds include lithium iron phosphate (LiFePO4) and lithium manganese phosphate (LiMnPO4), wherein the metal oxides includes iron oxides, reduced iron oxides, and cobalt oxide (Co3O4), wherein the lithium metal oxides include lithium cobalt oxide (LiCoO2), lithium manganese oxide (LiMn2O4), and lithium nickel manganese cobalt oxides (NMC or LMR-NMC), wherein the metal sulfides include lithium sulfide, titanium disulfide, and molybdenum disulfide (MoS2), and wherein the metal nitrides include titanium nitride and titanium oxynitride.

13. The nanoporous carbon composite of claim 1, wherein the nanoporous carbon composite is prepared by a process comprising multiple steps, the steps including preparing the polyimide precipitate, removing the reaction solvent, mixing the polyimide precipitate with the active electrode material and the additive to form a mixture, consolidating the mixture, or pelletizing the mixture, and carbonizing the polyimide under an inert atmosphere.

14. The nanoporous carbon composite of claim 13, wherein the process further comprises steps of:
    a) preparing a poly (amic acid) solution using the reaction solvent;
    b) mixing the poly (amic acid) solution with the active electrode material and the additive during or after preparation of the poly (amic acid); and
    c) conducting imidization of the poly (amic acid) to form the polyimide precipitate in the presence of the active electrode material, the additive, and the reaction solvent.

15. The nanoporous carbon composite of claim 13, wherein the process further comprises a step of mixing the polyimide precipitate with the active electrode material and the additive in the presence of a solvent to form a wet paste.

16. The nanoporous carbon composite of claim 15, wherein the solvent is selected from the reaction solvent used to prepare the polyimide precipitate, water, or a combination thereof.

17. The nanoporous carbon composite of claim 15, wherein the process further comprises steps of:
    a) calendering the wet paste into a sheet; and
    b) removing the solvent from the mixture by distillation.

18. The nanoporous carbon composite of claim 15, wherein the process further comprises steps of:
    a) removing the solvent from the wet paste to form polyimide coated active electrode material and polyimide coated additive by distillation; and b) milling the polyimide coated active electrode material and the coated additive to form a uniform mixture.

19. An electrochemical device comprising at least one cell, the cell including at least two electrodes, a separator positioned between the two electrodes, electrolyte, and current collectors; wherein at least one of said electrodes comprises the nanoporous carbon composite of claim 1.

20. The electrochemical device of claim 19 is selected from a group including batteries, supercapacitors, fuel cells, sensors, and capacitive desalination devices.

* * * * *